United States Patent [19]

Breuner

[11] Patent Number: 4,726,736
[45] Date of Patent: Feb. 23, 1988

[54] DRAG OPERATED ROTOR PITCH ADJUSTMENT SYSTEM FOR GYROPLANES

[76] Inventor: Gerald L. Breuner, 4114 Goodrick Ave., Richmond, Calif. 94801

[21] Appl. No.: 776,975

[22] Filed: Sep. 17, 1985

[51] Int. Cl.[4] .............................................. B64C 27/56
[52] U.S. Cl. .................................... 416/152; 416/160
[58] Field of Search ...................... 416/152, 160, 151

[56] References Cited

U.S. PATENT DOCUMENTS

| | | | |
|---|---|---|---|
| 1,447,080 | 2/1923 | Heath | 416/152 |
| 1,719,953 | 7/1929 | Wiegand | 416/152 |
| 1,964,102 | 6/1934 | Wishon | 416/152 |
| 2,108,660 | 2/1938 | Farrell | 416/152 X |
| 2,384,780 | 9/1945 | Dietrich | 416/152 |
| 2,423,400 | 7/1947 | Nichols | 416/160 X |
| 2,491,260 | 12/1949 | Green | 416/160 X |
| 2,648,387 | 8/1953 | Doman | 416/160 X |
| 3,879,153 | 4/1975 | Breuner | 416/141 |
| 4,534,524 | 8/1985 | Aldrich | 416/160 X |

Primary Examiner—Everette A. Powell, Jr.
Attorney, Agent, or Firm—David C. Ripma

[57] ABSTRACT

A drag operated collective pitch control system is provided for gyroplane rotary wing aircraft. The system employs drag surfaces which are selectively engaged while the hub is rotating to actuate the system. Each blade mount is provided with a feathering pivot. Pinion gears control the pitch of each blade, and the pinions, mounted on the hub, are engaged by a pair of ring gears, also carried on the hub. To operate the system, either one or the other of the ring gears, to which the drag surfaces are coupled, is engaged by suitable drag means. The pitch of all the blades is thereby adjusted simultaneously.

18 Claims, 5 Drawing Figures

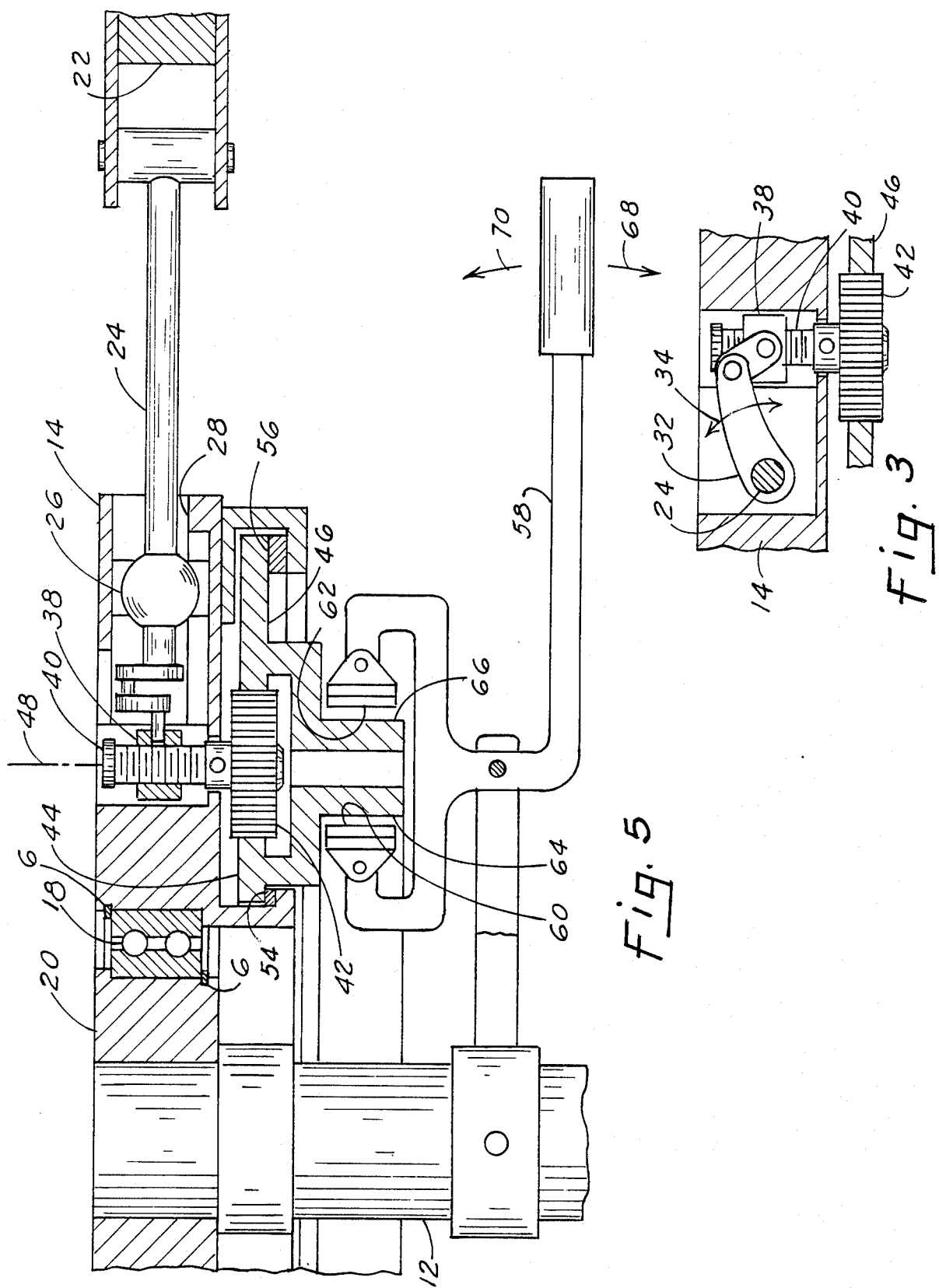

DRAG OPERATED ROTOR PITCH ADJUSTMENT SYSTEM FOR GYROPLANES

BACKGROUND OF THE INVENTION

This invention relates generally to systems for changing the pitch of all blades of a gyroplane rotary wing aircraft simultaneously and collectively to provide both for jump take-offs and for collectively controlling and adjusting the pitch of the blades while the aircraft is in flight.

The ability to simultaneously adjust or change the pitch of all rotor blades of a rotary wing aircraft is known as collective pitch control. Collective pitch control permits the blades of the aircraft to be pitched optimally during different phases of a flight. The blades can be depitched or set at a low angle of attack to reduce air resistance for cruising during forward flight, for example, or set at a higher angle for landing. The ability to control the pitch of the blades, both collectively (simultaneously for all blades) and cyclically (where the pitch of each blade changes as the blade rotates) is a necessary feature of helicopter design, and is also desirable in gyroplane rotary wing aircraft. Gyroplanes, known historically as autogyros, are a class of rotary wing aircraft in which the rotary wings or blades are rotated by air currents, not by engine torque. As a gyroplane moves through the air, air currents cause the rotor to turn by a process called autorotation. Although certain articulations of the blades, well known to those skilled in the art, are required to successfully operate gyroplanes, collective pitch control is optional. Both in the earliest autogyros and the newer generations of lightweight gyroplanes, fixed-pitch blades have often been used, usually to save weight, cost and complexity. Collective pitch control is desirable, however, since it permits jump take-offs and allows drag to be reduced in flight. Collective pitch control also provides greater control on landing. It would therefore be advantageous to have an improved collective pitch control system for gyroplane rotary wing aircraft which is simple to operate and effective.

SUMMARY OF THE INVENTION

Accordingly, a collective pitch control means is provided for use on a rotor assembly of a gyroplane rotary wing aircraft. The collective pitch control means comprises a hub rotatable about a first axis of rotation on which is supported a plurality of rotor blades. Blade mount means are associated with each blade for supporting the blade on the hub. Each blade mount includes means for changing the pitch of the associated blade. Such means includes pinion means supported on the hub and rotatable with respect to the hub, together with means for changing the pitch of the blade in one direction when the pinion means is rotated in a first direction and for changing the pitch of the blade in the opposite direction when the pinion means is rotated in a second direction. First and second pinion engaging means are each supported for independent rotation about the first axis of rotation. The pinion engaging means are each in light frictional contact with the hub to induce rotation with the hub. The first pinion engaging means engages and rotates all the pinion means on the hub in the first direction when rotating slower than the hub. The second pinion engaging means engages and rotates all the pinion means on the hub in the second direction when rotating slower than the hub. Drag means are also provided for selectively engaging the first and second pinion engaging means to slow the selected pinion engaging means relative to a rotating hub. Operation of the drag means while the hub and associated blades and blade mounts are rotating will produce a simultaneous change in the pitch of all the blades.

BRIEF DESCRIPTION OF THE DRAWINGS

FIG. 3 is an enlarged end view in partial cross section, taken along line 3—3 of FIG. 2, showing the actuator arm for feathering a blade and the pinion and follower portions of the collective pitch control system of the present invention.

FIG. 5 is an enlarged, partial cross sectional view of a portion of the rotor head shown in FIG. 4.

DETAILED DESCRIPTION OF THE PREFERRED EMBODIMENT

Figure 1:
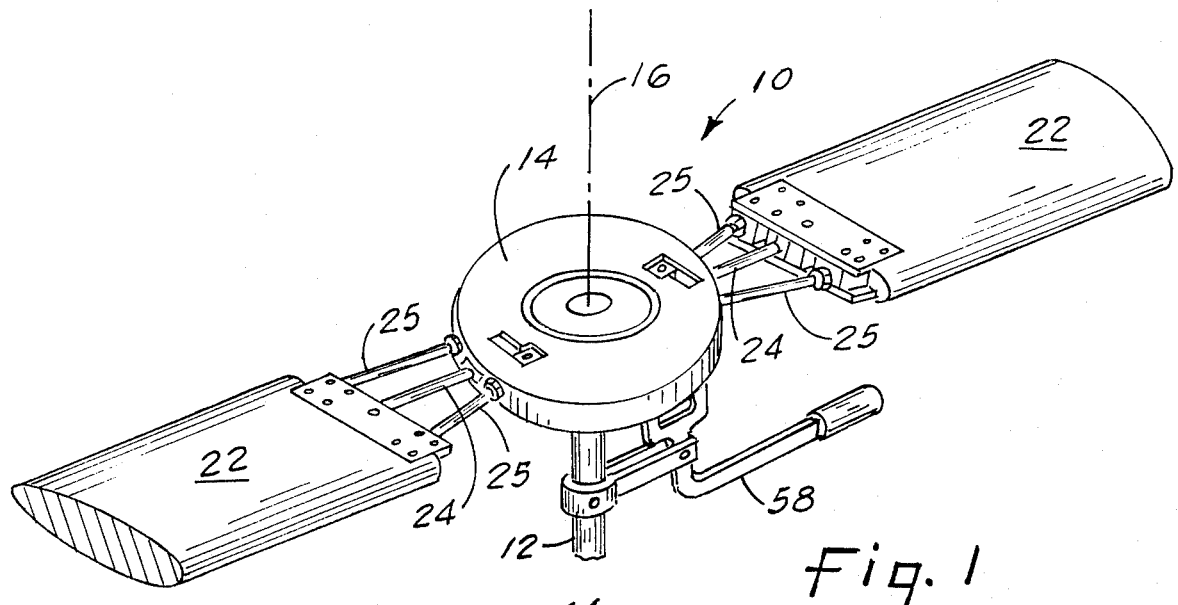
FIG. 1 is a fragmentary perspective view of a rotor and blade assembly of a gyroplane, incorporating the collective pitch control system of the present invention.

Referring to FIG. 1, a rotor assembly of a gyroplane or autogyro rotary wing aircraft is shown generally at 10. Basic elements of a rotor include a supporting mast 12 extending through a rotatable hub 14, which rotates about a first axis of rotation 16. In the illustrated embodiment, hub 14 rotates on bearings 18 (see FIG. 5) about a central non-rotating portion 20 of mast 12.

Figure 2:
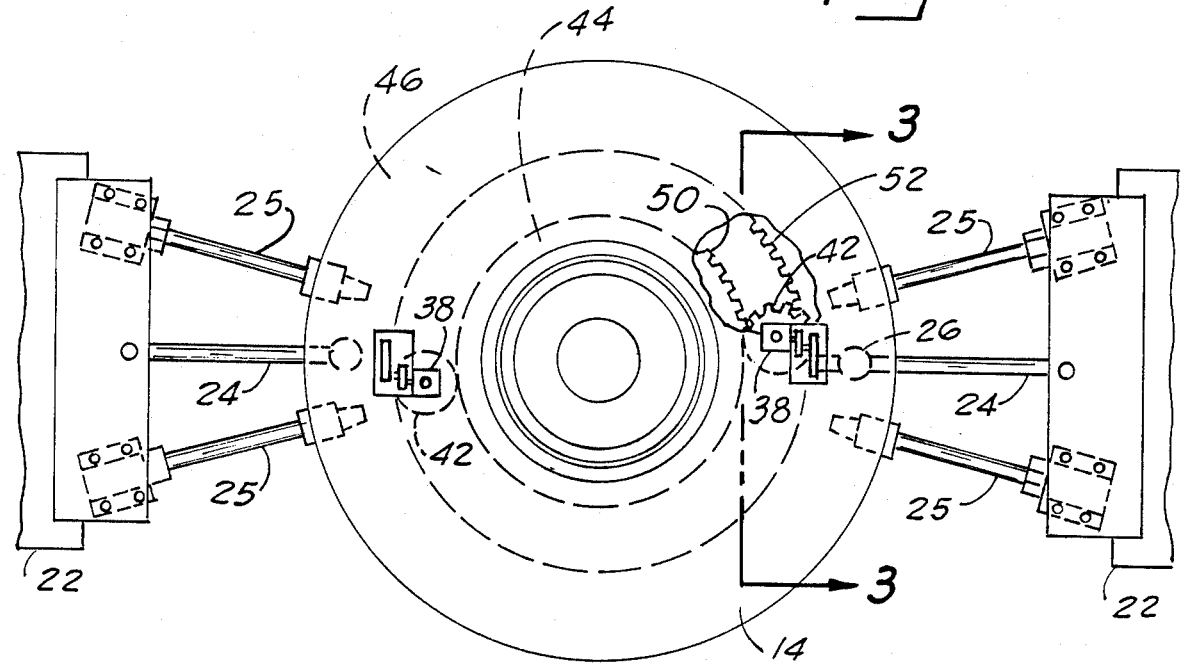
FIG. 2 is a top plan view, partly cut away, of the rotor head of FIG. 1.

Hub 14 supports a plurality of rotor blades 22 which, in the example shown, consists of a pair of opposed blades. Each blade 22 is attached to hub 14 by a pair of heavy stranded cables 25 which support and stabilize the blades. A pitch change control member, in the form of control tube 24, extends through a feathering pivot 26 (see FIGS. 2 and 5). Feathering pivot 26 and control tube 24, together with cables 25, are part of a blade mount means, associated with each blade, which allows the pitch of the associated blade to be changed by means of the system of the present invention. Referring to FIG. 5, feathering pivot 26 includes a spherical bearing which acts as a point around which the blade moves during flapping and lead lag articulations essential to gyroplane operation, in the manner well known to those skilled in the art. Such blade articulations are necessary for stable and controlled flight. Control tube 24 controls the pitch of the blade in the manner described below. A droop stop 28, against which tube 24 rests when the rotor is not turning, prevents excessive blade sag. In the illustrated rotor, cables 25 assist in stabilizing the blade articulations, and provide virtually the entire support for the blades. A more detailed description of the cable and control tube blade attachment system used in the illustrated embodiment is found in U.S. Pat. No. 3,865,511, invented by the inventor of the present invention. It will be understood by those skilled in the art that other types of blade attachment systems which do not include cables 25 can also be used with the collective pitch control system of the present invention.

Referring to FIGS. 2 through 5, the blade mount means of the present invention further includes feathering means for changing the pitch of the blades. The feathering means associated with each blade 22 includes pivot 26 and control tube 24. The blade is rotatable about a generally radially extending feathering axis of rotation running generally lengthwise through tube 24, to change the pitch of the blade. An actuator arm 32, extending laterally from the root end of control tube 24 (see FIG. 3), is movable in the direction of arrows 34 to change the pitch of the associated blade by rotating tube 24 about the feathering axis. Actuator arm 32 is coupled through a linkage 36 to a follower 38 which rides on a threaded shaft 40. Shaft 40 forms the upper part of a pinion means 42 supported on hub 14 and rotatable with respect to the hub. As pinion 42 is rotated on the hub, follower 38 is moved along shaft 40, which in turn operates actuator arm 32 and changes the pitch of the associated blade. Follower 38, together with linkage 36 and actuator 32, act as means responsive to the rotation of pinion 42 for changing the pitch of the blade. When pinion 42 is rotated in a first direction, blade pitch will be responsively changed or adjusted in one direction. When pinion 42 is rotated in the second or opposite direction, the blade pitch will be adjusted in the other direction. The angular position of pinion 42 thus determines the pitch of the associated blade. In the illustrated embodiment, one pinion and associated blade feathering system is provided for each blade.

During the normal operation of the rotor, flap and lead lag movements of each blade around pivot 26 will produce a certain amount of movement at the root end of tube 24, from which actuator arm 32 extends. With the other end of the arm attached, through linkage 36, to follower 38, any movement of tube 24 will produce a slight change in blade pitch. Such pitch changes, which are cyclic responses to the blade articulations, fall within the normal design parameters of rotor construction. Cyclic blade articulations and pitch variations are well known. The present invention is compatable with various rotor systems, including those which minimize or enhance such cyclic phenomena. Similarly, the magnitude and direction of the blade pitch changes produced by the system of the present invention, including such factors as the direction and pitch of the threads on pinion shaft 40, are all matters of design choice within the scope of the invention.

Pinion 42 is rotated relative to hub 14 by first and second ring gears 44 and 46, respectively, which are supported by hub 14, but are rotatable independent of the hub. Ring gears 44 and 46 serve, respectively, as first and second pinion engaging means for engaging and rotating pinions 42 in their respective first and second directions. Each pinion gear 42 is rotatable about a pinion axis 48. In the illustrated embodiment, the pinion axes are substantially parallel with first axis 16 of hub 14. In that orientation, first ring gear 44 is disposed radially inwardly of the pinions and includes a first drive gear surface 50 on its outer periphery drivingly engaging pinion gears 42 (see FIG. 2). Second ring gear 46 is disposed radially outwardly of the pinions and includes a second drive gear surface 52 on the radially inward periphery of ring 46, drivingly engaging pinion gears 42.

Ring gears 44 and 46 are supported on hub 14 for independent rotation about first rotational axis 16. The ring gears are supported on bearing sufaces which permit relative rotation between the respective ring gears and hub 14. Ring 44 rests on slidable bearing surface 54 and ring 46 rests on slidable bearing surface 56. With the ring gears supported in such a manner, the ring gears can be rotated independently of the rotation of the hub. Whenever the ring gears are moving relative to the hub, pinions 42 are rotated and a resultant collective change in the pitch of the rotor blades occur. When the rotor is rotating, either in flight or during pre-spin, and one or the other of the ring gears 44 and 46 is slowed or stopped, pinion gears 42 will be carried with the hub around the selected slower-moving ring gear. The motion of the gears against the selected ring gear will cause the pinions to spin on their axes. When the pinions are turned, followers 38 and actuators 32 are moved, changing the pitch of the blades simultaneously (collectively), in the manner described above.

Figure 4:
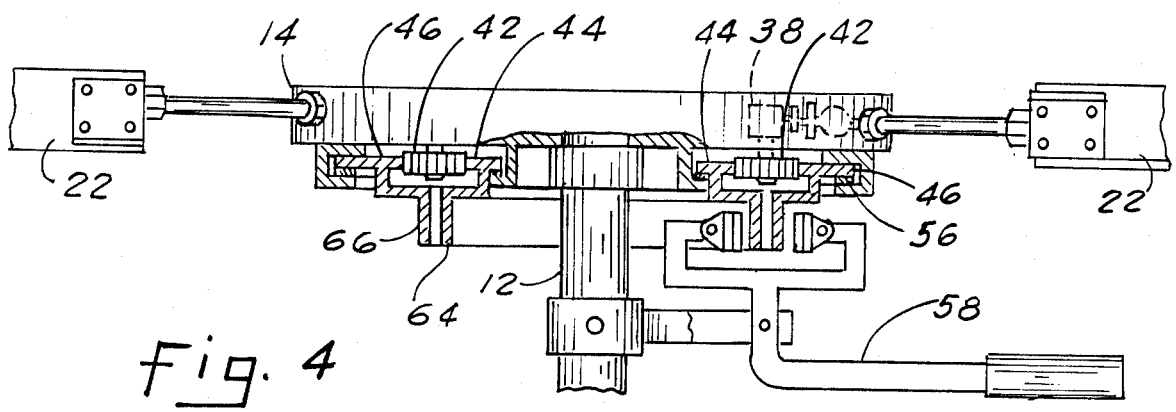
FIG. 4 is a side view partly in cross section of the rotor head shown in FIG. 2.

Means are provided for selectively slowing ring gears 44 and 46 relative to hub 14 during rotation of the hub, to accomplish collective pitch control. FIGS. 1, 4 and 5 show a selective drag actuator 58, in the form of a handle pivotally mounted on mast 12. Handle 58 terminates in first and second drag shoes 60 and 62, respectively, which are the actual drag surfaces which frictionally engage and slow ring gears 44 and 46 while hub 14 is rotating. To facilitate the operation of the drag means, rings 44 and 46 are each provided with drag surfaces which extend downwardly in a direction generally parallel with the first axis 16 of hub 14. First ring 44 is provided with first drag surface 64 and second ring 46 is provided with second drag surface 66. As shown most clearly in FIG. 5, drag surfaces 64 and 66 are generally cylindrical downwardly-extending portions integral with their respective ring gears 44 and 46. In the orientation shown, drag shoes 60 and 62 are selectively moved radially inwardly and outwarldy from axis 16 into and out of frictional contact with drag surfaces 64 and 66 by the pivoting of handle 58.

In operation, the collective pitch change system of the present invention provides for collective pitch control while rotor 10 is turning. During mormal gyroplane flight, rotor 10 will be turning at, for example, 200 r.p.m. As the hub rotates, pinions 42 and ring gears 44 and 46 will be carried with the hub. The light frictional contact provided by bearing surfaces 54 and 56, when no drag is applied, will insure that the ring gears will rotate with the hub. When collective pitch change is desired in one direction, handle 58 is pulled downwardly in the direction of arrow 68 (FIG. 5) causing drag shoe 60 to contact drag surface 64, slowing first ring gear 44. As the hub continues to rotate, relative motion exists between ring gear 44 and the hub, including pinions 42, and the pinions are all simultaneously turned an equal amount. The result is a collective pitch change in one direction of blades 22. When sufficient pitch change is achieved, handle 58 is released and ring gear 44 will regain the rotational speed of the hub. To effect a pitch change in the opposite direction, handle 58 is pushed upwardly, in the direction of arrow 70, engaging drag shoe 62 against drag surface 66. That will cause second ring gear 46 to rotate slower than hub 14, rotating pinions 42 in the opposite direction. The result is a collective pitch change in the opposite direction. As will the first ring gear, when handle 58 is released, ring gear 46 will regain the rotational speed of the hub and no further pitch change will occurr. Bearing surfaces 54 and 56 will provide sufficient light frictional contact between the hub and ring gears to insure that any speed differential with the hub wil disappear almost as soon as handle 58 is released. Handle 58 can be provided with a suitable centering means (not shown) to insure that shoes 60 and 62 are out of contact with their respective drag surfaces whenever the handle is released.

The collective pitch control system of the present invention is simple, convenient to use and requires a minimum of control linkages to be operated. The system can readily accommodate a plurality of blades on a rotor. Whether in a 2, 3 or 4 blade rotor, each rotor is provided with a pinion gear, follower and associated linkages and all can be collectively controlled by two ring gears. The shape and orientation of the pinions used can be adapted to design requirements. The pinions could be oriented horizontally with their axes extending radially, for example, and the ring gears could be disposed above and below the pinions. Other suitable orientations are also possible within the scope of the present invention. Whatever the orientation of the pinions, the two ring gears should be disposed on opposite sides of the pinion, relative to the pinion axis. In that way, one pinion engaging gear will turn the pinion in one direction when slowed relative to the hub and the other pinion engaging gear will turn the pinion in the other direction when slowed relative to the hub. The pinion engaging gears could assume a variety of shapes and sizes and could, for example, be gears separately mounted on the mast, rather than suspended from the hub, or be non-ring plate-type gears. The shape and orientations of the drag shoes and drag surfaces are suggestive only, and other such systems are possible within the scope of the present invention.

What is cliamed is:

1. Collective pitch control means for use on a rotor assembly of a gyroplane rotary wing aircraft, consisting of: a hub rotatable about a first axis of rotation for supporting a plurality of rotor blades, blade mount means associated with each said blade for supporting the blade on said hub, each said blade mount means including means for changing the pitch of the associated blade including pinion means supported on said hub and rotatable with respect to said hub and means responsive to the rotation of said pinion means for changing the pitch of the blade in one direction when said pinion means is rotated in a first direction and for changing the pitch of the blade in the opposite direction when said pinion means is rotated in a second direction, first and second pinion engaging means each supported for independent rotation about said first axis of rotation and each being in light frictional contact with said hub to induce rotation therewith, said first pinion engaging means engaging and rotating all said pinion means in said first direction when rotating slower than said hub, said second pinion engaging means engaging and rotating all said pinion means in said second direction when rotating slower than said hub, and drag means for selectively engaging said first and second pinion engaging means to slow the selected pinion engaging means relative to a rotating hub whereby operation of said drag means while said hub and associated blades and blade mount means are rotating will produce a simultaneous change in the pitch of all blades.

2. Collective pitch control means as in cliam 1 in which each said pinion means includes a pinion gear supported for rotation about a pinion axis, said pinion means engaging said first and second pinion engaging means on the periphery of said pinion gear.

3. Collective pitch control means as is cliam 2 in which said first pinion engaging means engages said pinion gear on one side of said pinion axis and said second pinion engaging means engages said pinion gear on the other side of said pinion axis.

4. Collective pitch control means as in cliam 3 in which said pinion axis of each said pinion gear is substantially parallel with said first axis of said hub and said first pinion engaging means includes a first dirve gear disposed radially inwardly from and drivingly engaging said pinion gears on said hub.

5. Collective pitch control means as in cliam 4 in which said first pinion engaging means includes a substantially circular first ring supported on said hub and rotatable about said first axis of rotation, said first dirve gear being disposed on the outer peripheral surface of said first ring.

6. Collective pitch control means as in cliam 4 in which said first pinion engaging means includes a first drag surface extending in a direction generally parallel with said first axis of rotation, and including means for selectively moving said drag means radially with respect to said hub into and out of frictional contact with said first drag surface.

7. Collective pitch control means as in cliam 3 in which said pinion axis of each said pinion gear is substantially parallel with said first axis of said hub and said second pinion engaging means includes a second drive gear disposed radially outwardly from and drivingly engaging said pinion gears on said hub.

8. Collective pitch control means as in cliam 7 in which said second pinion engaging means includes a substantially circular second ring supported on said hub and rotatable about said first axis of rotation, said second dirve gear being disposed on the radially inward periphery of said second ring.

9. Collective pitch control means as in cliam 7 in which said second pinion engaging means further includes a second drag surface extending in a direction generally parallel with said first axis of rotation, and including means for selectively moving said drag means radially with respect to said hub into and out of frictional contact with said second drag surface.

10. Collective pitch control means as in cliam 2 in which each said blade mount means includes actuator means extending from the associated blade, said actuator means being movable to change the pitch of the blade, and follower means movable relative to said pinion means in response to rotations of said pinion means, said actuator means being coupled to said follower means for movement therewith such that movement of said follower means in response to rotation of said pinion means moves said actuator means to change the pitch of the blade.

11. Collective pitch control means as in cliam 1 in which said drag means consists of a drag actuator mounted for pivoting movement and drag shoe means attached to said drag actuator for frictionally engaging selected ones of said first and second pinion engaging means for selectively slowing said first and second pinion engaging means while said hub is rotating.

12. Collective pitch control means for use on a rotor assembly of a gyroplane rotary wing aircraft which includes a hub rotatable on a non-rotating mast about a first axis of rotation, wherein the hub supports a plurality of rotor blades, said collective pitch control means comprising: blade mount means associated with each said blade for supporting the blade on said hub, each said blade mount means including means for changing the pitch of the associated blade including pinion means supported on said hub and rotatable with respect to said hub, each said pinion means including a pinion gear supported on said hub for rotation about a pinion axis, a substantially circular first ring supported on said hub on a bearing surface which permits relative rotation between said first ring and said hub, said first ring including a first drive gear on said first ring for engaging each said pinion gear on one side of said pinion axis to rotate all said pinion means in a first direction when said first ring rotates slower than said hub, a substantially circular second ring supported on said hub on a bearing surface which permits relative rotation between said second ring and said hub, said second ring including a second drive gear on said second ring for engaging each said pinion gear on the other side of said pinion axis from said first ring to rotate all said pinion means in a second direction when said second ring rotates slower than said hub, and means for selectively slowing said first and second rings relative to a rotating hub by drag means which includes only a pair of drag shoes mounted for pivoting movement on the non-rotating mast and a handle for selectively pivoting said drag shoes into and out of contact with said first and second ring gears.

13. Collective pitch control means as in cliam 12 in which each said blade mount means includes actuator means extending from the associated blade, said actuator means being movable to change the pitch of the blade, and follower means movable relative to said pinion means in response to rotations of said pinion means, said actuator means being coupled to said follower means for movement therewith such that movement of said follower means in response to rotation of said pinion means moves said actuator means to change the pitch of the blade.

14. Collective pitch control means for use on a rotor assembly of a gyroplane rotary wing aircraft which includes a hub rotatable on a non-rotating mast about a first axis of rotation, wherein the hub supports a plurality of rotor blades, the collective pitch control means comprising: blade mount means associated with each said blade for supporting the blade on said hub, each said blade mount means including means for changing the pitch of the associated blade including pinion means supported on said hub and rotatable with respect to said hub and means responsive to the rotation of said pinion means for changing the pitch of the blade in one direction when said pinion means is rotated in a first direction and for changing the pitch of the blade in the opposite direction when said pinion means is rotated in a second direction, first and second pinion engaging means each supported for independent rotation about said first axis of rotation and each being in light frictional contact with said hub to induce rotation therewith, said first pinion engaging means engaging and rotating all said pinion means in said first direction when rotating slower than said hub, said second pinion engaging means engaging and rotating all said pinion means in said second direction when rotating slower than said hub, and means for selectively slowing said first and second pinion engaging means relative to a rotating hub by drag means which includes only a pair of drag shoes mounted for pivoting movement on the non-rotating mast and a handle for selectively pivoting said drag shoes into and out of contact with said first and second pinion engaging means, whereby operation of said handle while said hub and associated blades and blade mount means are rotating will produce a simultaneous change in the pitch of all blades.

15. Collective pitch control means as in cliam 14 in which each said pinion means consists of a pinion gear supported for rotation about a pinion axis, said pinion means engaging said first and second pinion engaging means on the periphery of said pinion gear.

16. Collective pitch control means as in cliam 15 in which said first pinion engaging means engages said pinion gear on one side of said pinion axis and said second pinion engaging means engages said pinion gear on the other side of said pinion axis.

17. Collective pitch control means as in cliam 16 in which said pinion axis of each said pinion gear is substantially parallel with said first axis of said hub and said first pinion engaging means includes a substantially circular first ring supported on said hub and rotatable about said first axis of rotation and a first drive gear disposed on the outer peripheral surface of said first ring drivingly engaging said pinion gears on said hub.

18. Collective pitch control means as in cliam 17 in which said pinion axis of each said pinion gear is substantially parallel with said first axis of said hub and said second pinion engaging means includes a substantially circular second ring supported on said hub and rotatable about said first axis of rotation and a second drive gear disposed on the radially inward periphery of said second ring drivingly engaging said pinion gears on said hub.

* * * * *